(12) United States Patent
Mai et al.

(10) Patent No.: US 10,038,446 B2
(45) Date of Patent: Jul. 31, 2018

(54) RELIABILITY OF PHYSICAL UNCLONABLE FUNCTION CIRCUITS

(71) Applicant: Carnegie Mellon University, Pittsburgh, PA (US)

(72) Inventors: Kenneth Wei-An Mai, Pittsburgh, PA (US); Mudit Bhargava, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 14/913,285

(22) PCT Filed: Aug. 21, 2014

(86) PCT No.: PCT/US2014/052110
§ 371 (c)(1),
(2) Date: Feb. 19, 2016

(87) PCT Pub. No.: WO2015/027070
PCT Pub. Date: Feb. 26, 2015

(65) Prior Publication Data
US 2016/0182045 A1 Jun. 23, 2016

Related U.S. Application Data

(60) Provisional application No. 61/959,347, filed on Aug. 21, 2013.

(51) Int. Cl.
*H03K 19/003* (2006.01)
*H04L 9/32* (2006.01)
(Continued)

(52) U.S. Cl.
CPC ......... *H03K 19/00315* (2013.01); *G09C 1/00* (2013.01); *H04L 9/3278* (2013.01); *H04L 9/0866* (2013.01); *H04L 2209/12* (2013.01)

(58) Field of Classification Search
None
See application file for complete search history.

(56) References Cited

U.S. PATENT DOCUMENTS 8,260,708 B2    9/2012   Potkonjak
8,525,169 B1 *   9/2013   Edelstein .............. H01L 23/544
                                                                               257/48
(Continued)

FOREIGN PATENT DOCUMENTS

WO    WO/2015/027070    2/2015

OTHER PUBLICATIONS

Bhargava, Mudit, 2013, Reliable, Secure, Efficient Physical Unclonable Functions, Ph.D. Dissertation, Carnegie Mellon University.*
(Continued)

*Primary Examiner* — Alexander H Taningco
*Assistant Examiner* — Nelson Correa
(74) *Attorney, Agent, or Firm* — Fish & Richardson P.C.

(57) ABSTRACT

Techniques and circuits are disclosed for obtaining a physical unclonable function (PUF) circuit that is configured to provide, during a first operational mode, an output signal that is dependent on an electric characteristic of the PUF circuit. Techniques and circuits described herein can cause the PUF circuit to enter a second operational mode by applying a stress signal to the PUF circuit that changes a value of the electric characteristic relative to another value of the electric characteristic during the first operational mode of the PUF circuit; and adjusting, based on changing the absolute value of the first electric characteristic, a bias magnitude of the output signal relative to another bias magnitude of the output signal during the first operational mode of the PUF circuit.

31 Claims, 8 Drawing Sheets

(51) Int. Cl.
 G09C 1/00 (2006.01)
 H04L 9/08 (2006.01)

(56) References Cited

U.S. PATENT DOCUMENTS

| | | | | |
|---|---|---|---|---|
| 8,610,454 B2* | 12/2013 | Plusquellic | ........... | H04L 9/0861 326/8 |
| 8,619,979 B2* | 12/2013 | Ficke | ............ | H04L 9/3278 380/44 |
| 8,848,905 B1* | 9/2014 | Hamlet | ........... | H04K 1/04 380/35 |
| 9,015,500 B2* | 4/2015 | Guo | ............. | H04L 9/0866 713/194 |
| 9,082,514 B1* | 7/2015 | Trimberger | ........... | G11C 29/06 |
| 9,105,432 B2* | 8/2015 | Kim | ............. | H01H 85/0241 |
| 2009/0083833 A1 | 3/2009 | Ziola | | |
| 2011/0317829 A1 | 12/2011 | Ficke | | |

OTHER PUBLICATIONS

Bhargava. Reliable, Secure, Efficient Physical Unclonable Functions. May 2013. [retrieved on Nov. 19, 2014]. Retrieved from the Internet: <URL:http://repository.cmu.edu/cgi/viewcontent.cgi?article=1236&context=dissertations>.
International Search Report and the Written Opinion of the International Searching Authority for PCT/US2014/052110 dated Dec. 18, 2014, 14 pages.
B. Gassend et al., "Silicon physical random functions," in CCS '02: Proceedings of the 9th ACM conference on Computer and communications security. New York, NY, USA: ACM, 2002, pp. 148 160.
G. E. Suh and S. Devadas, "Physical Unclonable Functions for Device Authentication and Secret Key Generation," in Proceedings of 44th ACM/IEEE Design Automation Conference DAC '07, 2007, pp. 9-14.
J. W. Lee et al., "A technique to build a secret key in integrated circuits for identification and authentication applications," Proceedings of Digest of Technical Papers VLSI Circuits 2004 Symp, 2004, pp. 176-179.
D. Lim. et al., "Extracting secret keys from integrated circuits," IEEE Trans. VLSI Syst., vol. 13, No. 10, pp. 1200-1205, 2005.
D. E. Holcomb, W. P. Burleson, and K. Fu, "Power-Up SRAM State as an Identifying Fingerprint and Source of True Random Numbers," IEEE Trans. Comput., vol. 58, No. 9, pp. 1198-1210, 2009.
M. Bhargava, C. Cakir. and K. Mai, "Attack resistant sense amplifier based PUFs (SA-PUF) with deterministic and controllable reliability of PUF responses," in Proceedings of IEEE Int Hardware-Oriented Security and Trust (HOST) Symp, 2010.

Bhargava et al., "Comparison of Bi-stable and Delay-based Physical Unclonable Functions from Measurements in 65mn bulk CMOS," in Custom Integrated Circuits Conference, 2012. CICC '12. IEEE, Sep. 2012.
R. Maes et al., "Experimental evaluation of Physically Unclonable Functions in 65 nm CMOS," in ESSCIRC (ESSCIRC), 2012 Proceedings of the, Sep. 2012, pp. 486-489.
M.-D. Yu and S. Devadas, "Secure and Robust Error Correction for Physical Unclonable Functions," IEEE Design & Test of Computers, vol. 27, No. 1, pp. 48-65. 2010.
R. Maes et al., "PUFKY: A Fully Functional PUF-Based Cryptographic Key Generator," in CHES. Springer, 2012, pp. 302-319.
M.-D. M. Yu et al., "Lightweight and secure PUF key storage using limits of machine learning," in Proceedings of the 13th international conference on Cryptographic hardware and embedded systems, ser. CHES'11. 2011, pp. 358-373. [Online]. Available: http://dl.acm.org/citation.cfm?id=2044928.2044961.
M. Bhargava et al., "Reliability enhancement of bi-stable PUFs in 65nm bulk CMOS," in Hardware-Oriented Security and Trust (HOST), 2012 IEEE International Symposium on, Jun. 2012, pp. 25-30.
V. Vivekraja and L. Nazhandah, "Circuit-level techniques for reliable physically uncloneable functions," in Hardware-Oriented Security and Trust, 2009. HOST '09. IEEE International Workshop on, Jul. 2009, pp. 30-35.
G. Pobegen et al.., "Understanding temperature acceleration for NBTI," in Electron Devices Meeting (IEDM), 2011 IEEE International, Dec. 2011, pp. 27.3.1-27.3.4.
S. Bhardwaj et al., "Predictive Modeling of the NBTI Effect for Reliable Design," in Custom Integrated Circuits Conference, 2006. CICC '06. IEEE. Sep. 2006, pp. 189-192.
K. Miyaji et al., "A 6t sram with a carrier-injection scheme to pinpoint and repair fails that achieves 57% faster read and 31% lower read energy," in Solid-State Circuits Conference Digest of Technical Papers (ISSCC), 2012 IEEE International, Feb. 2012, pp. 232 234.
K. Agarwal and S. Nassif, "Characterizing Process Variation in Nanoneter CMOS," in Proceedings of 44th ACM/IEEE Design Automation Conference DAC '07, 2007, pp. 396-399.
R. W. Keyes, "Effect of randomness in the distribution of impurity ions on FET thresholds in integrated electronics," IEEE J. Solid-State Circuits, vol. 10, No. 4, pp. 245-247, 1975.
P. Oldiges et al., "Modeling line edge roughness effects in sub 100 nanometer gate length devices," in Proceedings of Int. Conference Simulation of Semiconductor Processes and Devices SISPAD 2000 pp. 131-134.
M. Pelgrom, "Matching properties of MOS transistors," IEEE J. Solid-State Circuits, vol. 24, No. 5, pp. 1433-1439, Oct. 1989.

* cited by examiner

RELIABILITY OF PHYSICAL UNCLONABLE FUNCTION CIRCUITS

CLAIM OF PRIORITY

This application is a §371 National Stage Application of PCT/US2014/052110, filed Aug. 21, 2014, which, in turn, claims the benefit of priority under 35 U.S.C. § 119(e) to provisional U.S. Patent Application No. 61/959,347, filed Aug. 21, 2013. The entire contents of each of which are hereby incorporated by reference.

STATEMENT REGARDING FEDERALLY SPONSORED RESEARCH AND DEVELOPMENT

This invention was made with government support under Grant Number CNS 1117755 awarded by the National Science Foundation. The United States government has certain rights in this invention.

FIELD OF USE

The present disclosure relates to the field of data processing, and more particularly, relates to methods to improve a reliability of physical unclonable function circuits.

BACKGROUND

Over the past decade, silicon physical unclonable function ("PUF") circuits have emerged as highly useful blocks in the design of secure hardware in applications such as identification, authentication and even encryption key generation. In general, PUF circuits derive their randomness from uncontrolled random variation phenomena that occur during the silicon chip manufacturing process. Rather than store a set of random bits, PUF circuits generate these random bits every time they are activated.

Most PUF implementations can do so by amplifying some electrical characteristic (e.g., delay or threshold voltage) from two nominally identical circuit components in the PUF core. For example, delay based PUF circuits, e.g., an arbiter type or ring oscillator type generate their random bits by amplifying a difference in delays of two nominally identical delay paths. Bi-stable element based PUF circuits, e.g., based on static random access memory (SRAM) or sense amplifier technology generate their random bits by amplifying differences in strengths of two or more transistors using a positive feedback structure (e.g., a cross-coupled inverter pair).

These electrical differences, especially when small, can flip a polarity in conditions involving environmental variations, e.g., voltage and temperature changes, in the presence of ambient noise, or over aging, resulting in some bits of the raw PUF circuit response being unreliable. Previous hardware studies have shown that for some designs more than 25% of the PUF circuit response bits may be unreliable across environmental variations. Since differences of larger magnitude require larger variations to flip polarity, larger electrical differences generally result in more reliable PUF circuits. Although some applications, such as identification and authentication, can be designed to tolerate a few errors in the response without significant loss of security, many applications can benefit from more reliable PUF circuits, and applications such as key generation require the PUF circuit response to be perfectly reliable.

The conventional methods to improve PUF circuit reliability use powerful error correction codes (ECC) to correct the raw response from the PUF circuit core. Unfortunately, these ECC blocks generally have significant VLSI overheads that can quickly scale up as the number of bits of correction increases.

Alternate techniques can increase a reliability of the PUF core and thus significantly reduce a strength (and complexity) of the ECC used. One method of increasing the reliability of the PUF core is to use normally detrimental integrated circuit (IC) aging effects to reinforce a desired (or "golden") response of the PUF by permanently altering the PUF circuit characteristics such that the difference in the electrical characteristic is increased in magnitude, and hence making the PUF more reliable.

Previous work used the IC aging phenomena of negative bias temperature instability (NBTI) to improve reliability of an SRAM circuit by approximately 40%. Despite its efficacy in increasing the SRAM circuit reliability, NBTI-based response reinforcement requires long baking times (e.g., greater than 20 hours) that are incompatible with an industrial high-volume-production manufacture and test flow.

Further, the high temperatures needed for NBTI-based reinforcement cannot be applied selectively, and thus would detrimentally age all circuits on the chip. Finally, transistor $V_{TH}$ shifts due to NBTI are not permanent, and the transistors can return to near their initial characteristics over time. NBTI can typically achieve a permanent $V_{TH}$ shift (after recovery) of only approximately 10-40 mV in PMOS devices over years of stress (equivalent to over tens of hours of accelerated aging under elevated voltage and temperature).

Therefore, a need exists for techniques and circuits to improve a reliability of a PUF circuit.

SUMMARY

The present disclosure relates to a PUF circuit response reinforcement technique based on hot carrier injection (HCI) that can reinforce a PUF golden response in short stress times (e.g., tens of seconds), without impacting the surrounding circuits, and that has high permanence (e.g., does not degrade significantly over aging). In some implementations, a self-contained HCI-reinforcement-enabled PUF circuit can be based on sense amplifiers (SA) that can autonomously self-reinforce with minimal external intervention.

In some implementations, SA-based PUF circuits can have good randomness and uniqueness characteristics similar to those of SRAM-based PUF circuits. At its core, an SA-based PUF circuit is similar to an SRAM-based PUF, and both may belong to a family of bi-stable PUF circuits.

In one aspect, a method includes obtaining a physical unclonable function (PUF) circuit, said PUF circuit configured to provide, during a first operational mode, an output signal that is dependent on an electric characteristic of the PUF circuit, and causing the PUF circuit to enter a second operational mode by applying a stress signal to the PUF circuit that changes an absolute value of the electric characteristic, relative to another value of the electric characteristic during the first operational mode of the PUF circuit, and adjusting, based on changing the absolute value of the electric characteristic, a bias magnitude of the output signal relative to another bias magnitude of the output signal during the first operational mode of the PUF circuit.

Implementations can include one or more of the following features. Adjusting, based on changing the absolute value of the electric characteristic, the bias magnitude of the output signal can include changing the bias magnitude of the output signal relative to a previous bias magnitude of the output signal before the application of the stress signal. Applying the stress signal to the PUF circuit that changes an absolute value of the electric characteristic can include applying the stress signal to the PUF circuit to increase the absolute value of the electric characteristic. Adjusting, based on changing the absolute value of the electric characteristic, the bias magnitude of the output signal can include increasing a probability of the PUF circuit for resolving to a certain output value during a plurality of times the PUF circuit is operated in the first operational mode, relative to another probability of the PUF circuit resolving to the certain output value independent of the adjusting. Causing the PUF circuit to enter the second operational mode can include stressing the PUF circuit by a response reinforcement process to increase the value of the electric characteristic, relative to the other value of the electric characteristic during the first operational mode of the PUF circuit, wherein the response reinforcement process is based on a circuit aging phenomena. Causing the PUF circuit to enter the second operational mode can include stressing the PUF circuit by a response reinforcement process to increase the value of the electric characteristic, relative to the other value of the electric characteristic during the first operational mode of the PUF circuit, wherein the response reinforcement process is selected one or more of a) hot carrier injection, b) negative-bias temperature instability, c) positive-bias temperature instability, and d) electromigration.

The method can include restoring the PUF circuit to the first operational mode, following a certain duration of the stress signal; and exiting the second operational mode. For example, the PUF circuit can include a delay based PUF circuit. The PUF circuit can include a bistable based PUF circuit. Obtaining the PUF circuit can include obtaining a substrate that comprises the PUF circuit, wherein the output signal is further dependent on one or more physical characteristics of the substrate.

The electric characteristic can include a first electric characteristic, and the method can further include causing each of a first input and a second input of the PUF circuit to be set to a predetermined voltage level, wherein the first and second inputs of the PUF circuit are respectively connected to at least a first circuit component having the electric characteristic as a first electric characteristic and a second circuit component having a second, different electric characteristic; and receiving the output signal of the PUF circuit, wherein the output signal is based on the first and second electric characteristics.

The first and second circuit components can include first and second transistor devices, respectively, and the first and second electric characteristics comprise first and second threshold voltages, respectively, for the corresponding first and second transistor devices. The output signal can be based on a difference between a first and a second delay value for the corresponding first and second circuit components. The output signal can be based on a difference in magnitudes between the first and second threshold voltages.

For example, the method can include during the second operational mode applying the stress signal as a first stress signal to a first one of the first and second transistor devices, and applying a second, different stress signal to a second, different one of the first and second transistor devices. For example, the method can include during the first operational mode, storing first and second transistor device output values that are based on the bias magnitude of the output signal, based on the first and second transistor device output values, determining which of the first and second transistors devices is to be stressed, during the second operational mode, selecting one of the first and second transistor devices to be stressed, based on the stored first and second transistor device output values, and applying the stress signal to the selected one of the first and second transistor devices.

The stress signal can include a stress voltage signal with a stress magnitude that is greater than a voltage magnitude of an operating voltage used during the first operational mode of the PUF circuit. For example, the stress magnitude is at least 1.25 times the voltage magnitude of the operating voltage used during the first operational mode of the PUF circuit. The stress signal can include a stress circuit signal with a magnitude that is greater than a current magnitude of a current flowing during the first operational mode of the PUF circuit.

The method can include selecting at least one of a magnitude and a duration of the stress signal, with selecting based on a magnitude of a stress signal value and a duration of the stress signal value for causing at least plurality of carriers in a first transistor device of the PUF circuit to be injected into a gate oxide of the first transistor device. Applying the stress signal to the PUF circuit can include causing a stress current with a stress current magnitude that is greater than an operating current magnitude of an operating current that is flowing during the first operational mode, wherein a flow of the stress current during the second operational mode is in a same direction as a flow of the operating current during the first operational mode.

Adjusting, based on changing the absolute value of the electric characteristic, the bias magnitude of the output signal can include increasing a probability of the PUF circuit for resolving to a certain output value over a plurality of operating conditions, relative to another probability of the PUF circuit resolving to the certain output value independent of the adjusting. Applying the predetermined stress signal to the PUF circuit can include causing a stress current with a current magnitude that is greater than an operating current magnitude of an operating current that is flowing during the first operational mode, wherein a flow of the stress current during the second operational mode is in an opposite direction as a flow of the operating current during the first operational mode.

The method can include re-adjusting the bias magnitude of the output signal relative to a previous value of the bias magnitude of the output signal by changing the absolute value of the electric characteristic, relative to a previous value of the electric characteristic during the first operational mode. For example, the method can include performing the re-adjusting a plurality of times over a life span of the PUF circuit.

In another aspect, a physical unclonable function (PUF) circuit can include first and second transistor devices, wherein a first gate terminal of the first transistor device and a second gate terminal of the second transistor device comprises a first and a second input terminal, respectively, of the PUF circuit, a cross-coupling circuit, wherein the cross-coupling circuit comprises third, fourth, fifth, and sixth transistor devices, wherein gate terminals of the third and fourth transistor devices are connected in a first common gate terminal and gates terminals of the fifth and sixth transistor devices are respectively connected in a second common gate terminal, a sense enable terminal connected to a seventh transistor device, the seventh transistor device connected to the first and second transistor devices, a first output terminal connected to the first common gate terminal, a second output terminal connected to the second common gate terminal; and a response reinforcement circuit comprising a thick gate oxide device connected to the first and second transistor devices, and first and second latch circuits, wherein the first latch circuit comprises at least an eighth transistor device connected to the first output terminal and a first buffer device connected to the first input terminal, and wherein the second latch circuit comprises at least a ninth transistor device connected to the second output terminal and a second buffer device connected to the second input terminal, and a stress mode enable terminal connected to each of the thick gate oxide device, the eighth transistor device, and the ninth transistor device.

In another aspect, a secure device can include a physical unclonable function (PUF) circuit for authenticating an identity of the secure device, wherein the PUF circuit is configured to provide, during a first operational mode, an output signal that is dependent on an electric characteristic of the PUF circuit, and a response reinforcement circuit, wherein the response reinforcement circuit is configured to cause the PUF circuit to enter a second operational mode by applying a stress signal to the PUF circuit that changes a value of the electric characteristic relative to another value of the electric characteristic during the first operational mode, and adjusting, based on changing the absolute value of the electric characteristic, a bias magnitude of the output signal relative to another bias magnitude of the output signal during the first operational mode. For example, the secure device can include a feature where the response reinforcement circuit is configured to cause the PUF circuit to enter the second operational mode based on a hot carrier injection to change the value of the electric characteristic, relative to the other value of the electric characteristic during the first operational mode.

Other features and advantages are apparent from the following description, and from the claims.

BRIEF DESCRIPTION OF THE FIGURES

Like reference numbers represent corresponding parts and/or portions throughout.

DETAILED DESCRIPTION

Figure 1:
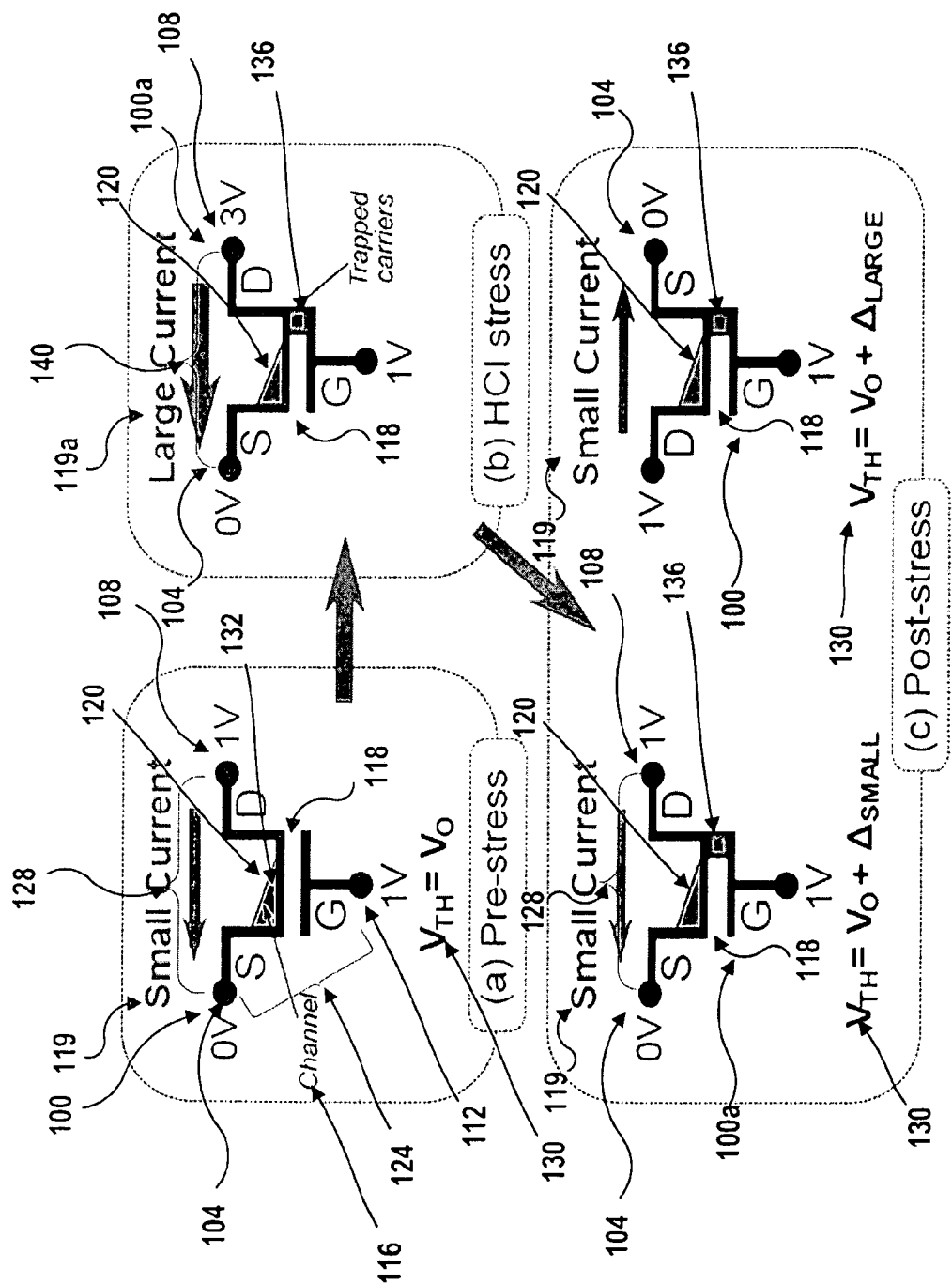
FIG. 1 is a schematic drawing showing (a) an example pre-stress n-channel metal oxide semiconductor field effect transistor (NMOS) transistor with normal biasing, (b) an example NMOS transistor under HCI stress conditions, and (c) example post-stress NMOS transistors with normal biasing (shown with current flow in two different directions).

The present disclosure relates to techniques and circuits for using integrated circuit (IC) aging effects including response reinforcement techniques to reinforce a PUF circuit response. For example, response reinforcement techniques and circuits can include hot carrier injection (HCI) techniques and circuits, negative-bias temperature instability (NBTI) techniques and circuits, positive-bias temperature instability (PBTI) techniques and circuits, and electromigration techniques and circuits. In some examples, a combination of one or more of these techniques can be used as the response reinforcement techniques. For instance, HCI techniques and circuits can be used to overcome shortcomings of NBTI-based reinforcement techniques.

For example, the techniques and circuits described herein can enable high PUF reliability across environmental variations and aging, while requiring only a very short, one-time, reinforcement stress. A PUF circuit can be provided on a semiconductor substrate. In general, an individual PUF circuit can be easy to manufacture but very difficult to duplicate, even given exact manufacturing processes that produce the PUF circuits. In this respect, a PUF circuit can be characterized as a hardware analog of a one-way function. Such PUF circuits and associated response reinforcement circuits as described herein can be used in high-security devices, e.g., as a means for providing device authentication and identification in a high security network. As an example, a PUF circuit along with response reinforcement circuits can be used in a laptop or handheld device for improving device security. The response reinforcement circuits can enhance a security of the device by making the security mechanism more reliable.

A PUF circuit can be configured to operate in two modes. For example, during a first operational mode (e.g., a normal or typical mode of operating the PUF circuit), the PUF circuit can produce an output signal (e.g., called the PUF circuit response) in response to a challenge signal. The PUF circuit response is dependent on an electric characteristic specific to the PUF circuit and/or the semiconductor substrate. For example, the electric characteristic can be, e.g., a delay or a threshold voltage corresponding to one of two nominally identical transistor devices in the PUF circuit. In some examples, the electric characteristic can be, for example, carrier mobility and/or channel length. In some examples, the response can be dependent on one or more of the above described electric characteristics, taken alone or in combination.

When a challenge signal (e.g., a signal that comprises a generated code) is applied to an array of PUF circuits, each PUF circuit in the array can react in an unpredictable (but repeatable) way due to an interaction of the challenge signal with a physical microstructure of the PUF circuit. An exact microstructure of the PUF circuit can depend on physical factors introduced during the manufacture of the PUF circuit which are unpredictable (e.g., like a fair coin toss). A specific challenge signal and its corresponding response signal together form a challenge-response pair or CRP.

During a second operational mode (e.g., a response reinforcement or stress mode of operating the PUF circuit), the PUF circuit may be stressed to reinforce its response signal. For example, the PUF circuit can be caused to enter the second operational mode by applying a stress signal, e.g., a high drain-source voltage or drain-source current as described in detail below with reference to FIG. 1. The stress signal can enhance or increase a value of the electric characteristic specific to the circuit (e.g., by increasing a threshold voltage, $V_{TH}$, of one of the two nominally identical transistor devices in the PUF circuit). In this manner, a magnitude of the offset in the output signal or its bias to resolve to a particular polarity can be increased. That is, a strength of one of the transistor devices can be increased resulting in an increased offset or bias magnitude of the output signal. As such, stressing can increase a probability of the PUF circuit to resolve to a certain output value across a plurality of times the PUF circuit is normally operated as described in detail below. For example, the stressing can increase a probability of the PUF circuit for resolving to a certain output value over a plurality of operating conditions (e.g., different temperature, atmospheric pressure, moisture, physical strain and/or compression conditions). Controlled response reinforcement techniques can be used to improve performance and reliability in static random access memories (SRAMs). For example, such techniques can achieve an increase of more than 100 mV in transistor threshold voltage ($V_{TH}$) in a short stress duration of, e.g., 10 seconds, without increasing a device temperature or a global supply voltage. In some examples, the stressing can change a polarity of the bias magnitude to be different relative to a polarity of the bias magnitude before the application of the stressing.

In some examples, some response reinforcement techniques, including HCI response reinforcement techniques, can be used to reinforce a PUF desired or "golden" response in short stress times (e.g., tens of seconds) which is over two orders of magnitude shorter than the time needed by, e.g., NBTI stress (e.g., more than 20 hours). In this regard, the techniques can achieve better reliability. In some implementations, the response reinforcement techniques can be performed in a series of steps that may be applied in a one-time, post-manufacture process. Accordingly, no response reinforcement stress may need to be applied once the PUF circuit is released in the field. In such implementations, once stressed, the stressed PUF circuit may have high permanence, e.g., the effect of the PUF stressing does not substantially lessen over time. After the stress signal is applied for a predetermined duration, e.g., 10 seconds, the stress mode can be exited by restoring the PUF circuit to the first operational mode.

In some examples, the response reinforcement techniques described herein may not impact circuits surrounding the PUF circuit. One reason for this is that the techniques may not need high temperatures or a high global voltage supply. For instance, an HCI response reinforcement circuit may use a targeted high voltage supply that is decoupled from the global supply voltage and has a magnitude of approximately 2.5V (nominally around 1.0V). Such a targeted high voltage supply can be connected to only a few select PUF circuits or devices selected for response reinforcement. In addition, in some implementations, the targeted high voltage supply may be typically available as an input/output (I/O) supply voltage for the semiconductor device pads and thus a dedicated extra supply may not be necessary for powering the operation of the response reinforcement circuit.

Further, the techniques and circuit described herein may be self-contained and may autonomously self-reinforce with minimal external intervention. For example, data related to the PUF circuit response bits need not be sent off chip thus minimizing a potential for the leakage of information. In some implementations, a PUF circuit can include a bi-stable PUF circuit based on, e.g., StrongARM sense amplifiers.

In some examples, the response reinforcement process may be used to substantially permanently alter a threshold voltage ($V_{TH}$) of a transistor device in a PUF circuit after the PUF circuit is manufactured (e.g., fabricated on a semiconductor substrate). In this process, high energy semiconductor carriers can be caused to become trapped in a gate oxide of the transistor device as described with reference to FIG. 1 below. In this manner, the threshold voltage ($V_{TH}$) of the transistor device may be increased and the reliability of the PUF circuit can be enhanced.

FIG. 1 gives an overview of HCI response reinforcement techniques for an example n-channel metal oxide semiconductor field effect transistor (NMOS) transistor device 100. As shown, the NMOS transistor device 100 includes three terminals: a source terminal 104, a drain terminal 108, and a gate terminal 112. The NMOS transistor device 100 also includes a channel 116 that facilitates a flow of carriers 120. In some implementations, the gate terminal 112 can be separated from the channel 116 by a thin insulating layer traditionally comprising of silicon dioxide. 118. During a first operational mode (e.g., a normal mode of operating the NMOS transistor device 100), a small drain-source current 119 can flow from the drain terminal 108 to the source terminal 104 through the channel 116.

FIG. 1(a) depicts the example NMOS transistor device 100 under typical biasing. In this instance, a gate-to-source voltage ($V_{GS}$) 124 and a drain-to-source voltage ($V_{DS}$) 128 of the NMOS transistor device 100 can be driven by nominal supply voltages (e.g., for illustration here these are both assumed to be 1V). As a result of the biasing, the NMOS transistor device 100 can operate in a saturation mode. A threshold voltage, $V_{TH}$ 130, of the NMOS transistor device 100 is a value of the gate-source voltage $V_{GS}$ 124 at which the channel 116 becomes conducting (e.g., through a process called "inversion" when a n-channel is induced in the transistor device 100) and connects the source and drain terminals 104, 108 of the transistor device 100 thus allowing a flow of carriers 120.

During a second operational mode (e.g., a response reinforcement stress mode of operating the NMOS transistor device 100), the device 100 may be stressed by, e.g. increasing a magnitude of the drain-source voltage $V_{DS}$ 108 to a magnitude of $V_{DS}$ 140 as shown in FIG. 1(b) of approximately 3V (e.g., three times the $V_{DS}$ 108 under normal biasing conditions). In some examples, an increased magnitude of $V_{DS}$ can be at least twice the magnitude of $V_{DS}$ under normal biasing conditions. In some examples, an increased magnitude of $V_{DS}$ can be at least 1.25-1.5 times the magnitude of $V_{DS}$ under normal biasing conditions. Such an NMOS transistor device 100 that is subject to an increased $V_{DS}$ is a stressed NMOS transistor device 100a as shown in FIGS. 1(b)-(c). In some examples, during the stress mode, the magnitude of $V_{DS}$ can be a same magnitude of $V_{DS}$ used during normal biasing conditions. In some examples, the magnitude of $V_{DS}$ can be lower than a magnitude of $V_{DS}$ during normal biasing conditions.

In the stress mode, the drain-source current 119 may increase in magnitude until it is a large magnitude of drain-source current 119a flowing in the NMOS transistor device 100a. In some examples, a direction of the large magnitude drain-source current 119a can be in a different direction from a direction of the pre-stress drain-source current 119. As a corresponding magnitude of $V_{DS}$ 108 increases, velocities of carriers 120 (e.g., ions) flowing in the NMOS channel 116 in a direction of the applied field can reach saturation. Given a short NMOS channel 116, the velocities of the carriers 120 can be said to have reached saturation in across much of the channel 116.

In this regard, an average velocity of the carriers 120 along a direction of an applied field no longer increases despite a number of internal collisions because those collisions are random in nature. However, the carriers 120 can continue to acquire kinetic energy from the collisions. As such, a random kinetic energy of the carriers 120 in the channel 116 increases. A portion of the carriers 116 called high energy electrons or ions or hot carriers 132 may acquire more kinetic energy than the rest of the carriers 116. A population of such hot carriers 132 increases at higher magnitudes of $V_{DS}$ 128.

In some instances, a small fraction of the hot carriers 132 can acquire enough energy to overcome a barrier energy of the silicon dioxide layer and get injected into a gate oxide 118 of the NMOS transistor device 100 as trapped carriers 136 (FIG. 1(b)). An NMOS transistor with carriers 136 trapped in the gate oxide 118 may need a higher $V_{GS}$ 124 for inversion (e.g., an induced n-channel in the NMOS transistor device 100), effectively increasing its threshold voltage $V_{TH}$ 130. When the stressed NMOS transistor 100a, with trapped carriers 133, is used under normal drain-source voltage $V_{DS}$ 108 biasing, as shown in FIG. 1(c), the stressed NMOS transistor 100a behaves asymmetrically under two normal drain-source $V_{DS}$ 108 biasing directions.

For instance, as shown in FIG. 1(c), when a drain-source current 119 flows in the same direction under normal biasing, as in the stressed biasing (e.g., direction of large drain-source current 119a), such that the trapped carriers 136 are near the drain terminal 108, the NMOS transistor device 100 experiences only a slight increase in $V_{TH}$ 130. However, when used with the source-drain directionality reversed, such that the trapped carriers 136 are near the source terminal 104, the NMOS transistor device 100 can see a much higher increase in $V_{TH}$ 130. One example reason for this is that, during inversion, most of the charge carriers accumulates in the channel near the source terminal 104. With the trapped carriers 136 near the source terminal 104, a larger $V_{GS}$ 124 is needed to attract the carriers 116 to cause inversion. Because the carriers 136 are trapped deep into the gate oxide 118, most of the increase in $V_{TH}$ 130 is substantially permanent. Thus, HCI response reinforcement as described above can be a good mechanism for reinforcing the PUF circuit response signal.

Figure 2:
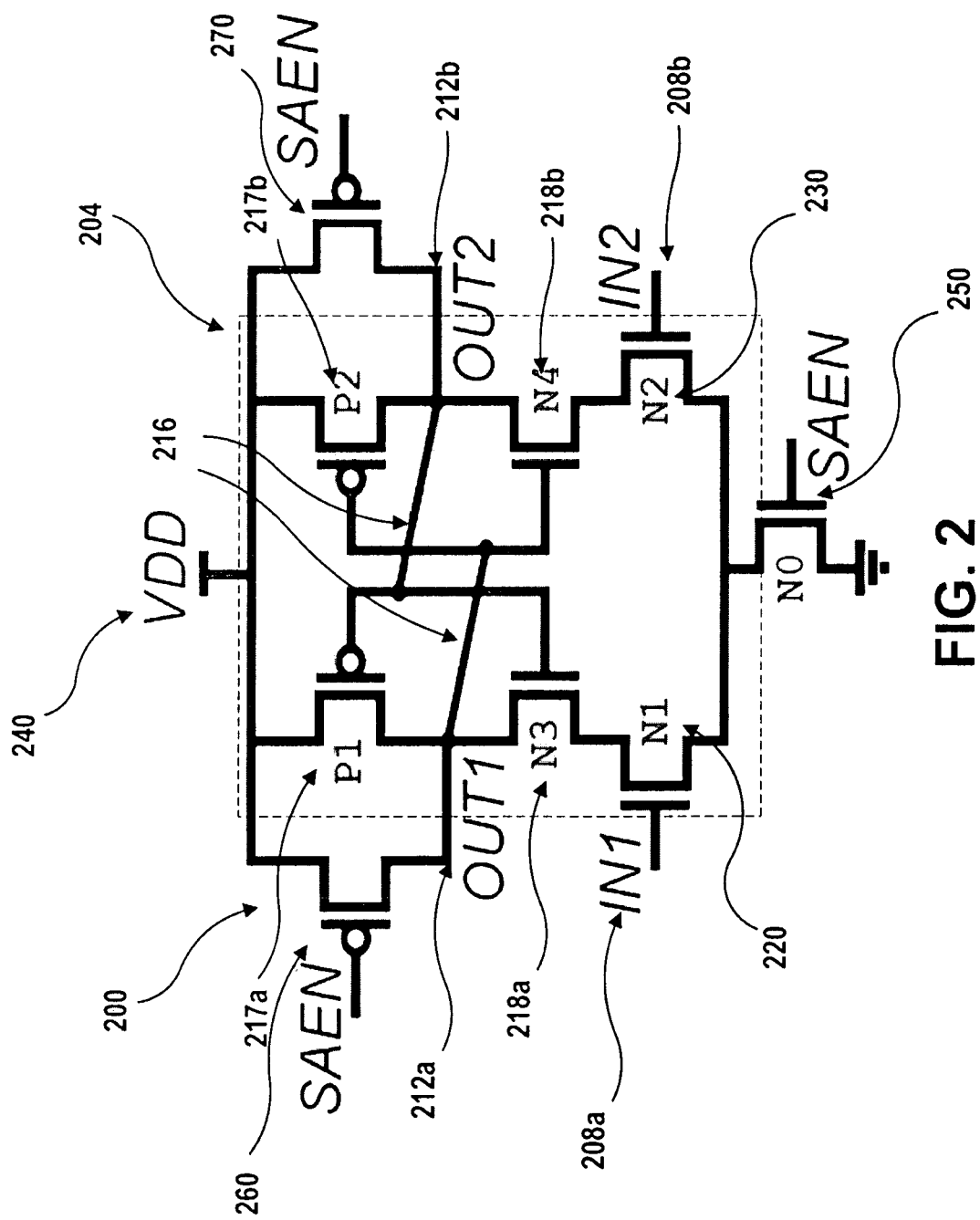
FIG. 2 shows a schematic of an example sense amplifier (e.g., a StrongARM sense amplifier)

A PUF circuit employing the response reinforcement techniques described herein can be based on a bi-stable circuit that uses sense amplifiers as a core element. FIG. 2 shows an example sense amplifier (SA) circuit 200 called a StrongARM sense amplifier. The SA circuit 200 can be used in a PUF circuit (as described below in connection with FIG. 3) that uses HCI-based response reinforcement to increase a reliability of the SA circuit 200 over environmental variations and aging (e.g., multiple uses). The SA circuit 200 includes a clocked circuit 204 that can amplify a small differential voltages and output full swing digital values (e.g., "10" or "01"), which can be used in memory read paths or as voltage comparators. The SA circuit 200 includes two input terminals 208a, 208b and two output terminals 212a, 212b. The input terminals 208a, 208b are connected to the gate terminals of transistor devices 220, 230 (labelled N1 and N2 in FIG. 2).

As shown, the two transistor devices 220, 230 can be connected to other transistor devices (labelled P1, P2, N3, and N4) 217a-b, 218a-b that are connected to each other through cross-coupling 216. As a result of this construction, the SA circuit 200 may have two stable states by construction: OUT1=1 or OUT1=0; OUT2=0 or OUT2=1. To generate a random bit, the cross-coupling 216 can be reset by forcing transistor devices 220, 230 to be equi-potential and then allowing them to resolve.

For example, the equi-potential voltage can be driven by a voltage source $V_{DD}$ 240 connected to transistor devices 217a, 217b. A transistor device 250 that is connected to ground can be turned on to enable (or "fire") the SA circuit 200 by asserting an SAEN signal at a gate terminal of the transistor device 250. When transistor device 250 is turned on (e.g., SAEN=1), the source voltage $V_{DD}$ can be caused to be applied equi-potentially to the matched devices 217a-b, 218a-b, and 220, 230. Enabling SAEN (SAEN=1) can also cause transistor devices 260, 270 to be enabled to read the output signals OUT1 and OUT2.

If the matched transistor devices 217a-b, 218a-b, and 220, 230 in the cross-coupled SA circuit 200 are sized and laid out symmetrically (e.g., transistors 217a, 217b are symmetrically designed and transistors 218a, 218b are symmetrically designed), then a final state of the cross-coupled SA circuit 2100 is equally likely to be an output of OUT1=1 or OUT1=0; OUT2=0 or OUT2=1 and depends on differences in relative device strengths that originate from manufacturing process variations. If manufacturing process variations are pre-dominantly random in nature, then a final state of the cross-coupled SA circuit 200 may be random and unpredictable.

Under ideal conditions, an ideal SA circuit 200 can correctly amplify even a small input differential voltages. In practice, however, variations in the components of the SA circuit 200 (e.g., transistor devices 220, 230) may result in an offset (or bias). The offset is a measure of a natural tendency of the SA circuit 200 to resolve to a particular polarity (e.g., either "10" output or "01" output). For reliable operation, a difference in the input voltages to the SA circuit may need to be greater than the offset.

An offset in the output signals from the SA circuit 200 can result from a combination of systematic and random variations. For example, systematic variations can be due to manufacturing gradients and layout asymmetries. Such variations can be minimized by a symmetric layout of matched devices (e.g., symmetrically arranging the layouts of transistor devices 220, 230). For example, random variations can be a result of random uncertainties in a fabrication process. Such uncertainties can include random dopant fluctuation, e.g., fluctuations in a number and location of dopants in the transistor device channel (e.g., channel 116 of FIG. 1) and gate line-edge roughness. For example, gate line-edge roughness may arise from imperfections edge smoothness of the gate material used in the transistor device affecting the effective channel length of the transistor. These imperfections can be due to random process variations which can affect nominally identically designed transistors differently, thus leading to intra-die transistor variations in on current, leakage current, and other characteristics. In some instances, the effects of such uncertainties can be mitigated by using larger components in the SA circuit 200.

To use the SA circuit 200 as a PIM circuit core, the SA circuit input terminals 208a, 208b (IN1 and IN2 in FIG. 2) can be shorted together. For example, the input terminals 208a, 208b can be set to a same voltage level, with zero differential input. The SA circuit 200 can then be turned on by applying equal potentials to the two transistor devices 220, 230 through the voltage source $V_{DD}$ 240. The SA circuit 200 may resolve to an output value determined by its individual offset or bias.

For example, an output offset or bias of the SA circuit 200 can be a strong function of the difference in threshold voltages $V_{TH}$ of transistor devices 220, 230. The offset (and hence a reliability) of the SA circuit 200 can be increased by increasing the difference in the $V_{TH}$ of transistor devices 220, 230 (e.g., by increasing an absolute value of $V_{TH}$ of one of the transistor devices 220, 230). To maximize the randomness of the response, the SA circuit 200 can be designed to be as symmetric as possible (thus minimizing systematic offset), but with small devices in the matched pairs 217a-b, 218a-b, and 220, 230 (thus maximizing bias magnitude).

An offset or bias of a SA circuit 200 is strong indicator of its reliability in a PUF circuit. An SA circuit 200 with high offset (e.g., a strong bias to resolve to a particular polarity) will likely resolve to a same polarity across environmental variations and over aging. Measured hardware results as discussed in detail below show high reliability from SA-based PUF circuits with relatively large offsets (e.g., greater than 40 mV). An exact offset cutoff for such high reliability may vary with technology, design specifics, or measurement conditions. In some implementations, PUF circuits described herein may be coupled with ECC circuits to establish a predetermined error probability or bit error rate.

Figure 3:
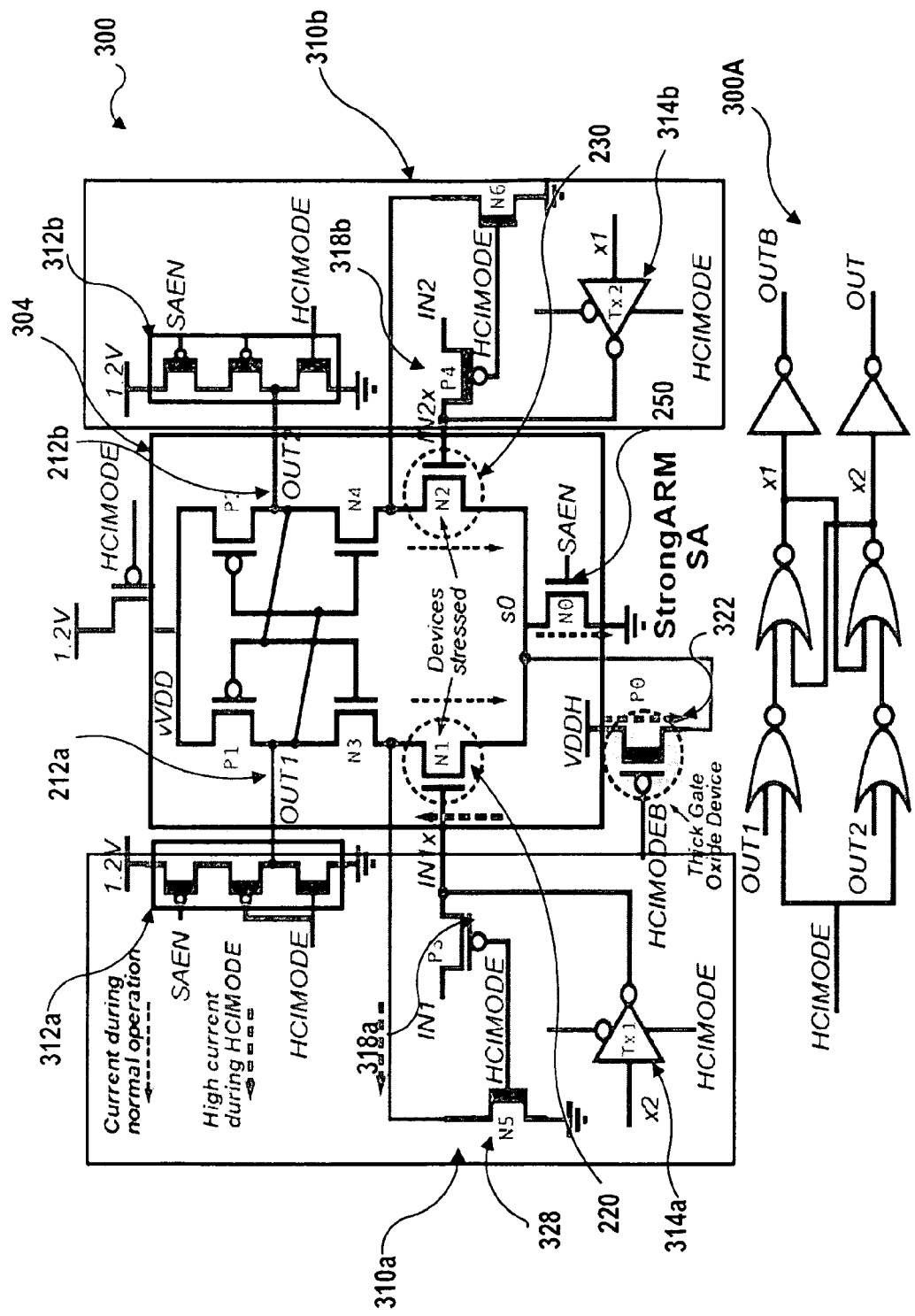
FIG. 3 shows a schematic of an example HCI-enabled sense amplifier (HCI-SA) in which a baseline StrongARM sense amplifier has been modified with a stress circuit to enable HCI based aging.

FIG. 3 shows an example HCI-enabled sense amplifier (HCI-SA) based PUF circuit 300. As shown, in some implementations, a StrongARM based SA circuit 304 (e.g., a similar SA circuit 200 as shown in FIG. 2) can be used with additional response reinforcement circuit (circuit apart from SA circuit 304 shown in FIG. 3) as the HCI-SA circuit 300. Although only one HCI-SA circuit 300 is shown and described herein, it should be understood that the HCI-SA circuit 300 can be repeated as a plurality of HCI-SA circuit 300 elements in an array.

The additional circuit included in the HCI-SA PUF circuit 300 includes latch circuit 310a, 310b to receive output values OUT1 and OUT2 from output terminals 212a, 212b during a first operational mode and apply those values to the SA circuit 304 during a second, stress mode. Each latch circuit 310a, 310b includes one or more transistor devices 312a, 212b for receiving output values OUT1 and OUT2 and tri-state buffers 314a, 314b for storing the output values as x1 and x2 respectively. For example, the HCI-SA PUF circuit 300 uses the HCI response reinforcement techniques described above (see FIG. 1 and related description) to reinforce the individual offsets or biases of each SA circuit 304 in a larger array of HCI-SA PUF circuits 300. The measurement of the offset polarity and reinforcement can be done autonomously by the HCI-SA PUF circuit 300 as described below.

In some implementations, the HCI-SA PUF circuit 300 can be programmed for higher reliability by stressing either one or both of the transistor devices 220, 230 (labelled as N1 or N2 in FIG. 3) after manufacturing and prior to first use as the HCI-SA PUF circuit 300. For example, the HCI-SA PUF circuit 300 can be configured to select both transistor devices 220, 230 for stressing to different degrees and/or amounts. In some cases, the stressing can be performed individually for each HCI-SA PUF circuit 300 in a larger array of HCI-SA PUF circuits 300, but since an offset reinforcement circuit is self-contained for each HCI-SA PUF circuit, all HCI-SA PUF circuits 300 can be reinforced in parallel. For example, if offset0 is an offset or bias before the stressing, then the offset or bias after the stressing (e.g., offsetS) can have a same sign (i.e. polarity) as offset0 and a higher magnitude.

The HCI-SA PUF circuit 300 can operate in two modes: a first operational mode and a second operational HCI stress mode, controlled by a stress mode enable signal, HCI-MODE. In the first operational mode (e.g., signal HCI-MODE=0), the HCI-SA PUF circuit 300 act as normal StrongARM SA circuit (e.g., similar to the operation of SA circuit 200 described above with reference to FIG. 2). In the HCI stress mode (e.g., signal HCIMODE=1), one of the transistor devices 220, 230 can be stressed.

Figure 4:
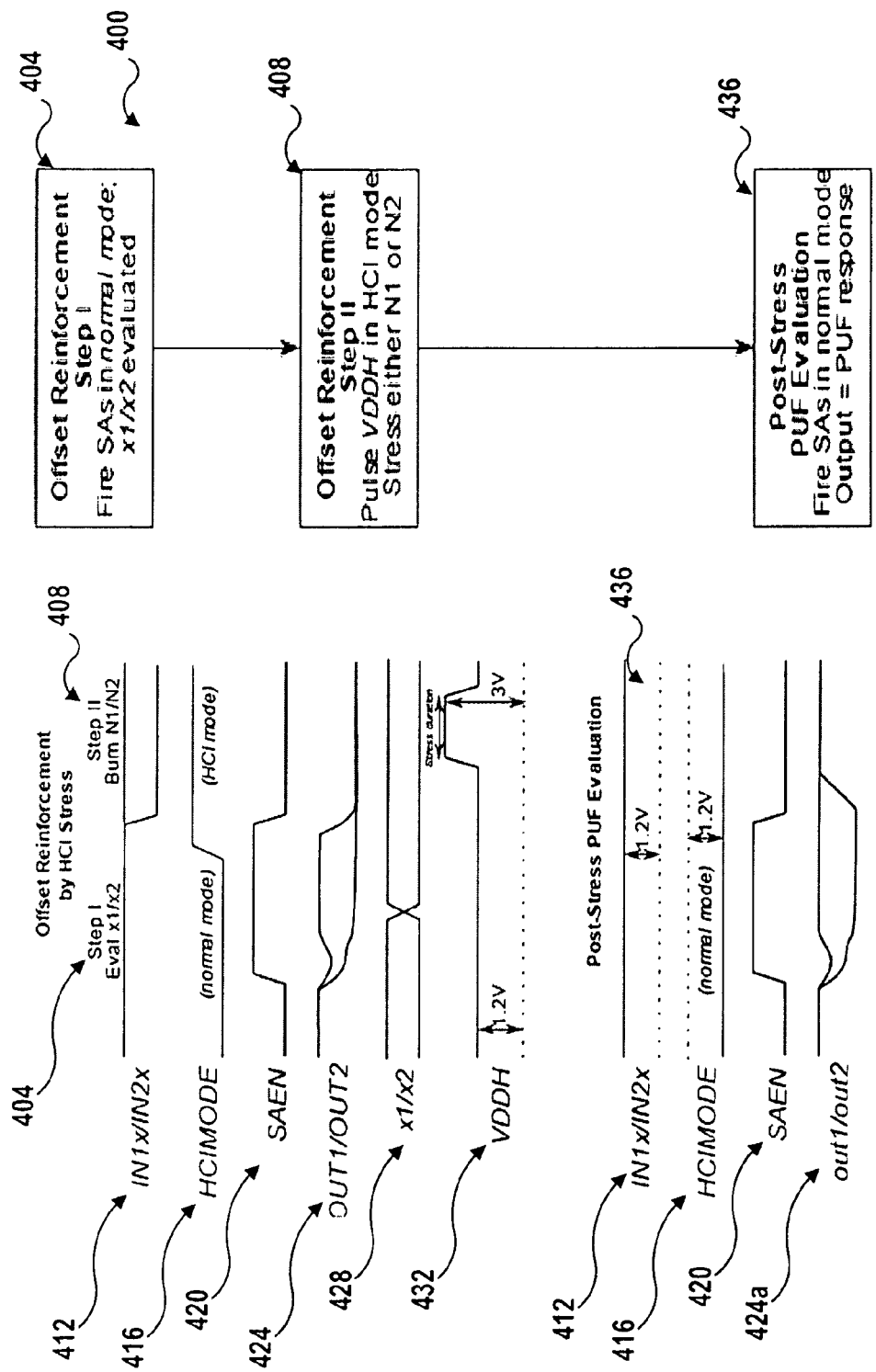
FIG. 4 shows an example HCI response reinforcement process for stressing an HCI-SA PUF circuit.

Referring to FIG. 4, an example HCI response reinforcement process 400 is shown. The HCI response reinforcement process 400 can be carried out in two steps: 1) an offset polarity measurement and storage step 404, and 2) an HCI offset reinforcement step 408. A post-stress step 436 is shown to study the effect of the example HCI response reinforcement process 400. FIG. 4 shows pre-stress signals at the gate terminals (input terminals) of the transistor devices 220, 230 as INx1 and INx2 (shown together as signals 412). In addition, FIG. 4 shows statuses of pre-stress signals, HCIMODE signal 416, SAEN signal 420 (described above in connection with FIG. 2), response signals as OUT1/OUT2 signals 424, buffered values x1 and x2 428, and source voltage value $V_{DDH}$ 432 during the two steps 404, 408.

FIG. 4 also depicts post-stress signals during the post-stress step 436 at the gate terminals (input terminals) of the transistor devices 220, 230 as INx1 and INx2 signals 412, the HCIMODE signal 416, and the SAEN signal 420 (each of which are similar to the pre-stress signals described above), and post-stress response signals as out1/out2 signals 424a.

In the offset polarity measurement and storage step 404, the HCI-SA PUF circuit 300 can determine which of the transistor devices 220, 230 is to be stressed. In some examples, during this step the HCI-SA PUF circuit 300 can be configured to select both transistor devices 220, 230 for stressing. In an example where a single one of the transistor devices 220, 230 is selected, the HCI-SA PUF circuit 300 can make the determination of which of the transistor devices 220, 230 is to be stressed based on the buffered values of x1 and x2 428. The values of x1 and x2 428 may be internally generated in the HCI-SA PUF circuit 300 during a normal operating mode of the circuit 300.

As an illustration, assume that a threshold voltage $V_{TH}$ of the transistor device 220 (N1) is higher than a threshold voltage $V_{TH}$ of the transistor device 230 (N2) for a given HCI-SA PUF circuit 300. Further, assume that all other devices in the HCI-SA PUF circuit 300 are matched (e.g., referring to FIG. 2, each of transistor device pair's 217a-b and 218a-b are symmetrical). During the offset polarity measurement and storage step 404, the HCI-SA PUF circuit 300, when fired, may resolve to an output characterized as OUT1=1, OUT2=0 (asserted by signals OUT1/OUT2 424). These values can be latched as buffered values of x1=1, x2=0 (e.g., by asserting buffered values x1/x2 428).

During the second step of offset reinforcement 408, the HCIMODE signal is asserted to HCIMODE=1. Further, transistors P3 and P4 318a, 318b can be disabled and the tri-state buffers Tx1 and Tx2 314a, 314b can be enabled. The values at x1 and x2 428 can force the values at INx1/INx2 412 to IN1x=1 and IN2x=0. Thus, during the offset reinforcement step 408, transistor device N1 420 is selected to be stressed.

After the initial conditions are set as described above, the voltage value $V_{DDH}$ 432 is asserted as a pulse of high voltage (approximately 3V) resulting in a high current path through transistor device P0 322 (e.g., a PMOS transistor device having a thick gate oxide), transistor device N1 220, and transistor device N5 328. Each of the transistor device P0

322, transistor device N1 220, and transistor device N5 328 is sized such that most of the voltage drop (e.g., approximately 2.5-2.8V when provided with a pulse of 3V) is seen across the drain-source terminals of the stressed transistor device N1 220. This creates the stress conditions for transistor device N1 220 as described above in connection with FIG. 1 and results in an increased threshold voltage $V_{TH}$ for transistor device N1 220 when the HCI-SA PUF circuit 300 is later used as a PUF in normal mode (e.g., post-stress step 436).

In some examples, the HCI-SA PUF 300 circuit can be configured to stress both transistor devices 220, 230, (e.g., one at a time or simultaneously). For example, the process described above for selecting one of the transistor devices 220, 230 can be repeated but with different values of x1 and x2 so that a different one of the transistor devices 220, 230 can be stressed (e.g., at a different voltage level, duration, and/or direction) than the selected one of the transistor devices 220, 230 in the process above. For example, if both transistor devices 220, 230 are selected to be stressed at the same time, but with different voltage levels, durations, and/or directions, the response reinforcement circuit can be modified to supply the different stress signals. As an example, a different voltage supply can be added to the circuit to provide a second source of a stress signal. In some examples, the stressing can applied such that a polarity of a natural bias of the HCI-SA PUF 300 circuit (e.g., a polarity of the output signal) can be changed to an opposite polarity. For instance, if the natural bias of the HCI-SA PUF 300 is such that the HCI-SA PUF 300 tends to resolve to a "10" prior to the application of the stress signal, then the stressing can change the output to a "01".

In some implementations, the high voltage ($V_{DDH}$) 434 may be connected to a single thick gate oxide PMOS transistor device P0 322 for each HCI-SA PUF circuit 300 in an array of HCI-SA PUF circuits 300. The thick gate oxide transistor device 322 can withstand a higher $V_{GS}$ without gate oxide breakdown and is a common process technology option because thick oxide devices are needed in the device pads. An amount of stress (e.g., a strength or extent of offset reinforcement) can be controlled by the pulse width and the voltage of $V_{DDH}$ 432. In some implementations, a supply of approximately 2.5-3V may be available on the substrate die as the input/output (I/O) pad supply and thus the offset reinforcement step 408 may not require a separate dedicated voltage supply.

In a post-stress step 436, the HCI-SA PUF circuit 300 can be fired under normal operating conditions as shown. In particular, the INx1/INx2 signals 412 can be asserted to 1.2V (nominal 1V) and the HCIMODE signal 416 can be set to HCIMODE=0. The SAEN signal is asserted to fire the HCI-SA PUF circuit 300 and reinforced response signals out1/out2 424a can be obtained. The reinforced response signals out1/out2 424a can have a higher offset during post-stress normal operation than during pre-stress normal operation.

In some examples, the HCI-SA PUF circuit 300 may undergo a one-time HCI response reinforcement step (e.g., step 408 of FIG. 4) immediately after manufacturing. This one-time step 408 may take a few tens of seconds of HCI response reinforcement stress resulting in a substantially permanent offset shift in each of the HCI-SA PUF circuits 300 in a direction determined by random process variations. After this one-time stress, the HCI-SA PUF circuit 300 can be used just as a regular PUF circuit by activating it in a normal operating mode. As such, the HCI response reinforcement technique can be applied to devices including such a HCI-SA PUF circuit 300 as an initial post-manufacturing step and devices in the field may not be subjected to any additional HCI response reinforcement stress.

In some examples, the response reinforcement techniques described here can increase a reliability of the PUF circuit over multiple evaluations. For instance, a resulting change in the PUF circuit can result in an increase in reliability over multiple evaluations over circuit aging. In some examples, the techniques can increase a reliability of the PUF circuit across different voltage levels and temperatures. The response reinforcement process can be performed multiple times to reinforce a bias magnitude of the output signal over the life of the PUF circuit. The process can be performed multiple times to re-stress the PUF circuit to modify the bias magnitude over the life of the chip containing the PUF circuit. For instance, the process can also be performed multiple times to re-stress the PUF circuit to perform reliability over multiple applications (e.g., uses) of the PUF circuit over the life of the chip containing the PUF circuit.

In some implementations, both transistor devices 220, 230 in the PUF circuit (e.g., PUF circuit 304 in FIG. 3) can be stressed by either equal amounts or different amounts. For example, threshold voltages of the transistor devices 220, 230 can be stressed based on different voltages, currents, durations, and/or directions. In the example of FIG. 3, the circuit of HCI-SA PUF circuit 300 can be modified to select both transistor devices 220, 230 (e.g., one at a time, or both simultaneously) to apply different levels of stress current, or for different durations, and/or in different directions.

To demonstrate and evaluate the techniques described herein, an exemplar 5.5 mm$^2$ full custom ASIC testchip in 65 nm bulk CMOS technology was designed and fabricated. The testchip included an HCI-SA PUF circuit (e.g., similar to the example HCI-SA PUF circuit 300 described above). On each chip, there were 3,200 HCI-SA PUF circuits in a total area of 0.32 mm$^2$ that includes scan flops for testing. Each HCI-SA PUF circuit was laid out in an area of 20.8 μm$^2$ that includes one thick gate oxide PMOS per cell. The HCI-SAs were arranged in two arrays of 1,600 elements each. All 1,600 HCI-SA PUF circuit elements in an array were designed to share common IN1, IN2, and SAEN signals. The outputs were sent to flip-flops connected in a scan chain for easy read out. One array had the capability of self-contained offset reinforcement as described above. The other array was designed as a fail-safe and each HCI-SA PUF circuit element's reinforcement direction was loaded from a scan chain. However, the self-contained reinforcement circuits worked as designed and all results presented herein were measurements taken from those arrays. The chips were packaged in a 132-pin PGA package and tested using a custom designed 4-layer PCB.

Using the testchip implementation described above, the following information was recorded: an HCI-SA PUF circuit element offset, reliability across environmental variations and aging, uniqueness, and randomness. The measurements were taken across a voltage range of ±20% of the nominal 1V VDD (e.g., 0.8V to 1.2V) and temperatures of −20° C., 27° C., and 85° C. A TestEquity Model 107 temperature chamber was used to fully enclose the test PCB during temperature variation testing.

The HCI-SA PUF circuits were incrementally stressed using 3V $V_{DDH}$ pulses of example width 1 s, 4 s, 20 s, and 100 s which resulted in a cumulative stress of 1 s, 5 s, 25 s, and 125 s. As described above, the 3V $V_{DDH}$ supply was connected to a thick gate oxide PMOS transistor per HCI-SA to avoid oxide breakdown of other devices in the circuit. Offset reinforcement requires firing the HCI response reinforcement aspect of the HCI-SA PUF circuit once (e.g., all can be fire together because SAEN, IN1, and IN2 can be shared across all HCI-SA PUF circuits in an array) in the normal mode followed by a pulse of high voltage at VDDH in the HCI stress mode.

To evaluate an efficacy of HCI response reinforcement in altering the HCI-SA PUF circuit offset, an offset of each of the 1,600 HCI-SAs was measured before and after the HCI offset reinforcement. To measure the offset (either before or after HCI stress), the input differential (e.g., a voltage difference between IN1 and IN2) was swept from −400 mV to +400 mV in steps of 10 mV. At each step, the HCI-SA PUF circuits were fired multiple times. The outputs after every activation were read out of the output scan chain. These were then post-processed to measure the offset of each HCI-SA PUF circuit in the array.

Figure 5:
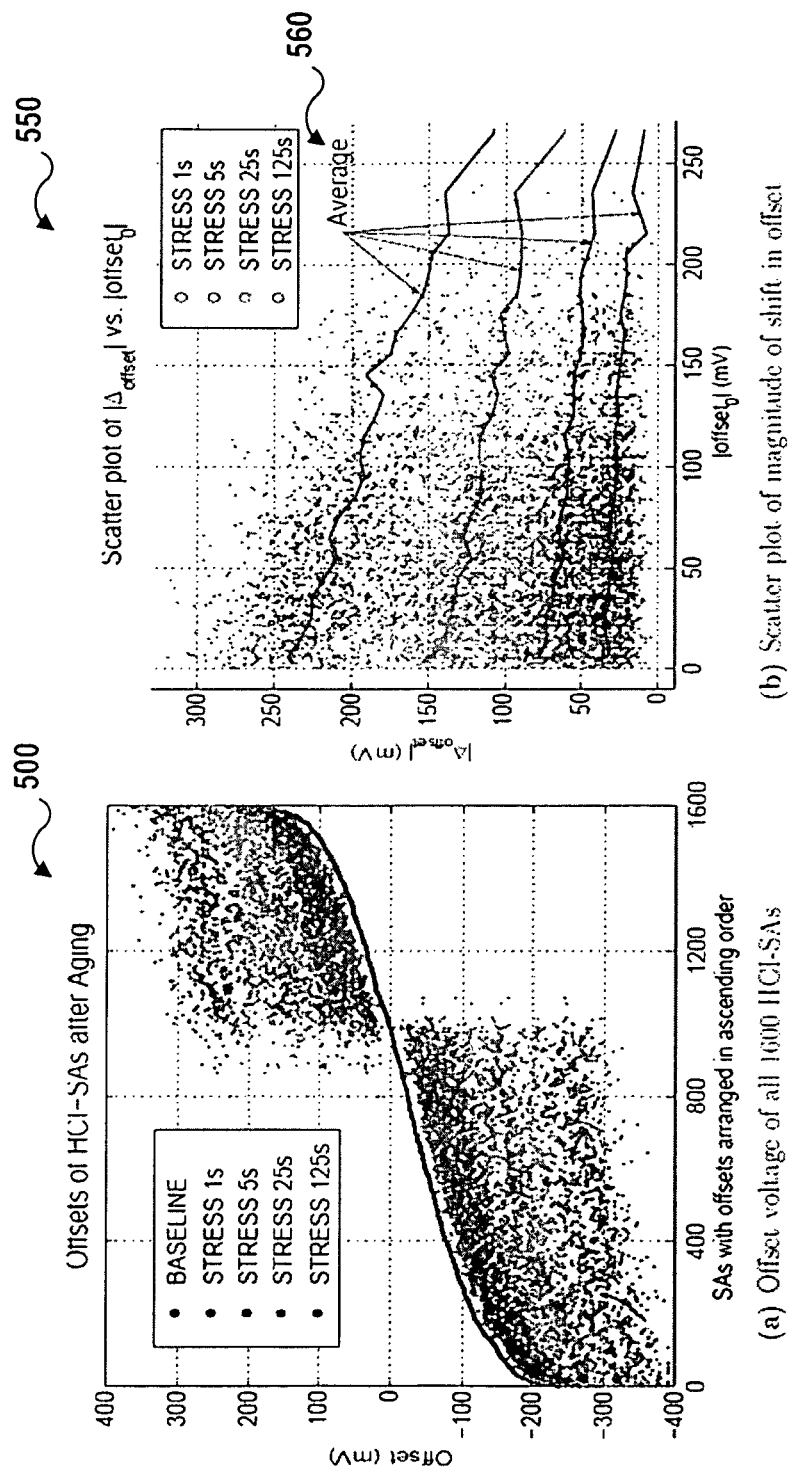
FIGS. 5a and 5b show data on (a) a measured offset of 1,600 HCI-SA PUF circuits on a die before and after HCI stress, and (b) a scatter plot of shift in measured offset after HCI stress compared to a measured offset before stress.

FIG. 5a shows the measured offset of all HCI-SA PUF circuits of a chip, before and after HCI response reinforcement stress, when arranged in order of their offset0 in ascending order. As expected, a shift in the offset was higher for longer stress durations. For example, for a 1 s stress, a shift in the offset was approximately 10-50 mV and for a stress of 125 s, the shift was approximately 150-300 mV.

FIG. 5b shows the scatter plot 550 of the magnitude of the shift in offset (|Δoffset|) vs. |offset0| for different stress durations. As expected, |Δoffset| was higher for longer stress durations. For a 1s stress, |Δoffset| was approximately 10-50 mV and for a stress of 125 s, |Δoffset| was approximately 150-300 mV. Moreover, on average (as shown by the bold lines 560 in FIG. 5b), |Δoffset| was slightly larger for HCI-SA PUF circuits with low magnitude of offset0, which can be desirable because HCI-SA PUF circuits with low magnitudes of offset may need a larger shift for reliability.

Figure 6:
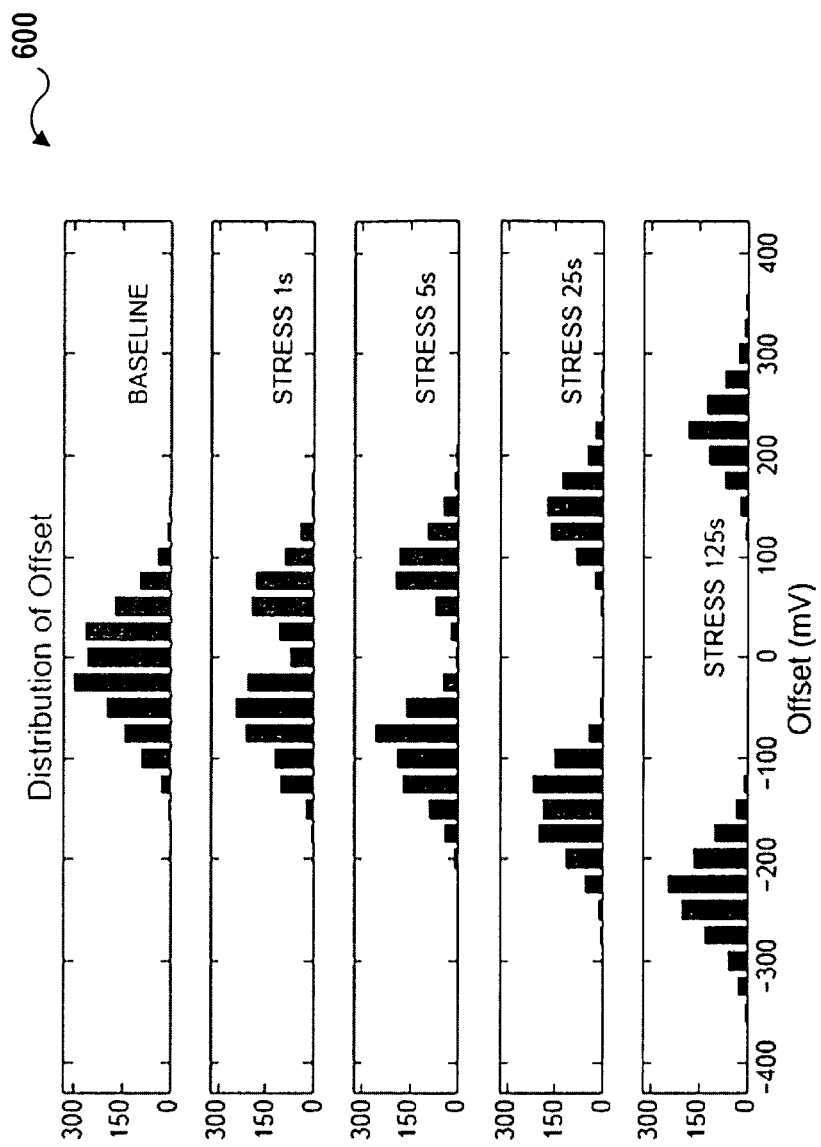
FIG. 6 shows example data on a distribution of measured offset values of about 1,600 self-programmable HCI-SAs on a die before and after HCI stress (measured at 1.2V and 27° C.).

FIG. 6 shows a measured distribution 600 of the offset for one chip before and after HCI response reinforcement stress at 1.0V and 27° C. The offset0 has a typical normal spread as expected. The mean was slightly skewed ($\mu 0 = -23$ mV) and may be due to a layout systematic bias. The standard deviation of offset0 was 79 mV. After stress, the distribution splits into two groups. HCI-SA PUF circuits with negative offset0 have their offset shifted to the left (more negative) and HCI-SA PUF circuits with positive offset0 have their offset shifted to the right (more positive). A minimum magnitude of offset after stress of 1 s, 5 s, 25 s, and 125 s is 5 mV, 28 mV, 92 mV, and 158 mV respectively.

FIGS. 5a and 6 show that HCI response reinforcement stress can increase offset in HCI-SA PUF circuits. Offset can be an indirect measure of reliability and PUF reliability can be directly measured by multiple evaluations across environmental variations and over aging. For direct measurement of reliability, the following can be performed:

i. Perform 100 PUF evaluations at each possible combination of voltage (0.8V, 1.0V, 1.2V) and temperature (−20° C., 27° C., 85° C.). Each PUF evaluation generates 1,600 response bits corresponding to the 1,600 HCI-SA PUF circuits elements in the array. A majority vote of the 100 responses at the nominal conditions (27° C. and 1.0V) can be considered a golden response against which the response at other conditions may be compared.

ii. At every combination of voltage and temperature, each of the 100 evaluations can be compared to the golden response. $Error_{i,V1,T1}$ is defined as a number of bits out of the 1,600 HCI-SA PUF circuit outputs that do not match the golden response in the $i^{th}$ evaluation at voltage=V1 V and temperature=T° C.

iii. % errors are defined at a voltage-temperature combination ($Error_{V1,T1}$) as the maximum $Error_{i,V1,T1}$ across the 100 evaluations. The % errors across voltage-only variations ($Error_{V\ only}$) is defined as a maximum errors across the 100 evaluations at all voltage variations and at nominal temperature e.g., maximum of $Error_{0.8,27}$, $Error_{1.0,27}$, and $Error_{1.2,27}$. Similarly, % errors across temperature-only variations ($Error_{T\ only}$) is defined as a maximum errors across the 100 evaluations at all temperature variations and at nominal voltage e.g., maximum of $Error_{1.0,-20}$, $Error_{1.0,27}$, and $Error_{1.0,85}$. The overall % errors ($Error_{V\&T}$) is defined as a maximum errors across the 100 evaluations at all voltage and temperature combinations. Using this methodology, the reported % errors was the largest % of bits that were erroneous for any of the voltage/temperature conditions in any of the 100 PUF evaluations performed at that voltage/temperature. In other words, adding an ECC with the capability to correct that % of the bits could result in a perfect response (e.g., matching the golden response) at every evaluation.

Figure 7:
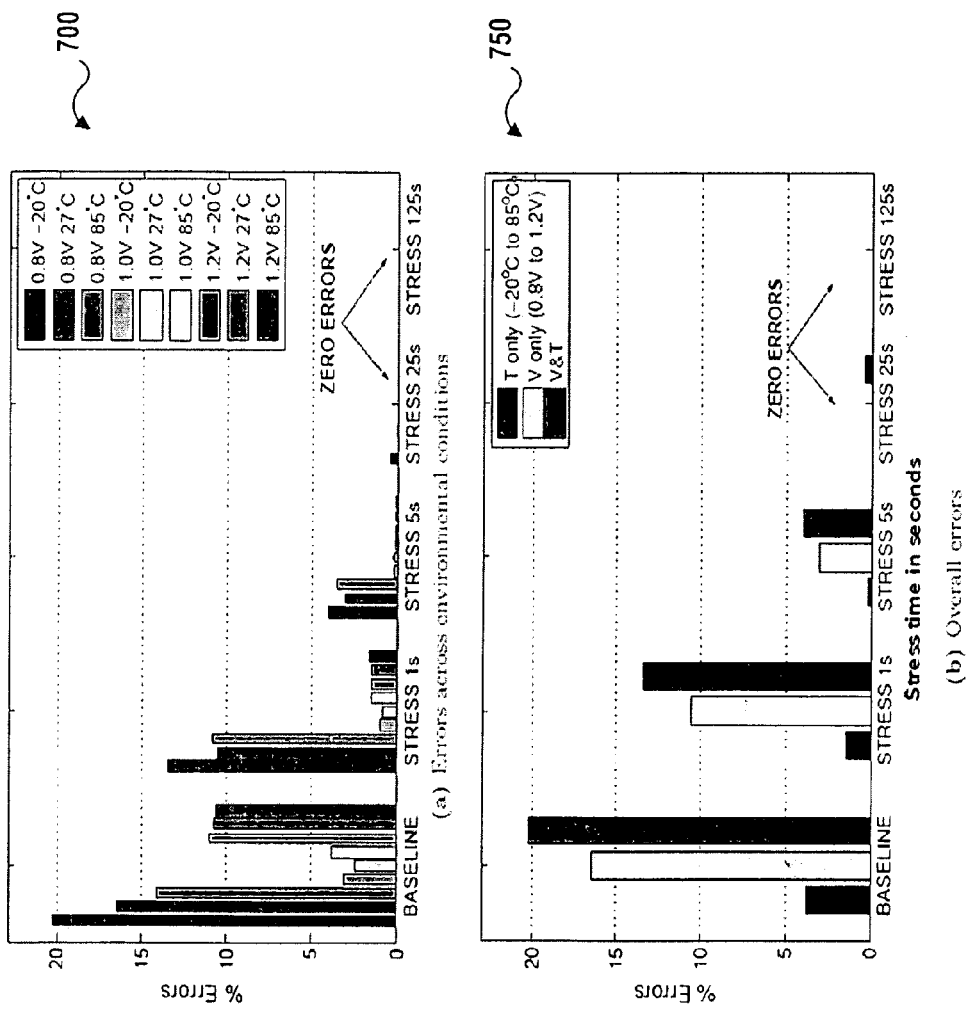
FIG. 7 shows example data on a reliability of HCI-SAs as a percentage of errors.

These measures of reliability were taken for an exemplar die before and after different stress durations. FIG. 7(a) is a histogram 700 showing an improvement in reliability for HCI-SA PUF circuits with different stress durations and when expressed as % errors. FIG. 7(b) is a histogram 750 showing the overall errors (across all voltage and temperature variations considered) reduce from 20.3% to 13.5%, 4.0%, 0.43%, and 0% when stressed for 1 s, 5 s, 25 s, and 125 s respectively. This means that with 125 s stress, there were no errors for any of the 1,600 HCI-SA PUF circuits across all of 100 evaluations at all voltage and temperature combinations. Variations in voltage have a stronger impact on reliability as compared to temperature variations. For temperature only variations, the % errors reduce from 3.8% to 1.4%, 0.19%, 0%, and 0% when stressed for 1 s, 5 s, 25 s, and 125 s respectively; and for voltage only variations, the % errors reduce from 16.5% to 10.6%, 3.1%, 0%, and 0% when stressed for 1 s, 5 s, 25 s, and 125 s respectively. FIG. 7(a) shows that highest number of errors are seen at low-temperature and low-voltage (0.8V and −20° C.).

To measure permanence of HCI-stress over aging, the reliability of a HCI-stressed chip is measured both before and after aging, and simulated in a shorter duration using elevated temperature and voltage. A chip is baked, originally stressed for 125 s, at 150% of nominal 1V (=1.5V) and 100° C. for 93 hours, resulting in an acceleration factor of 161.4 and hence an aging of approximately 1.7 years for a chip operating at nominal conditions (1.0V and 27° C.). Measurements showed 0% errors before and after accelerated aging, suggesting that the impact of HCI-stress is not significantly reversed with aging.

Figure 8:
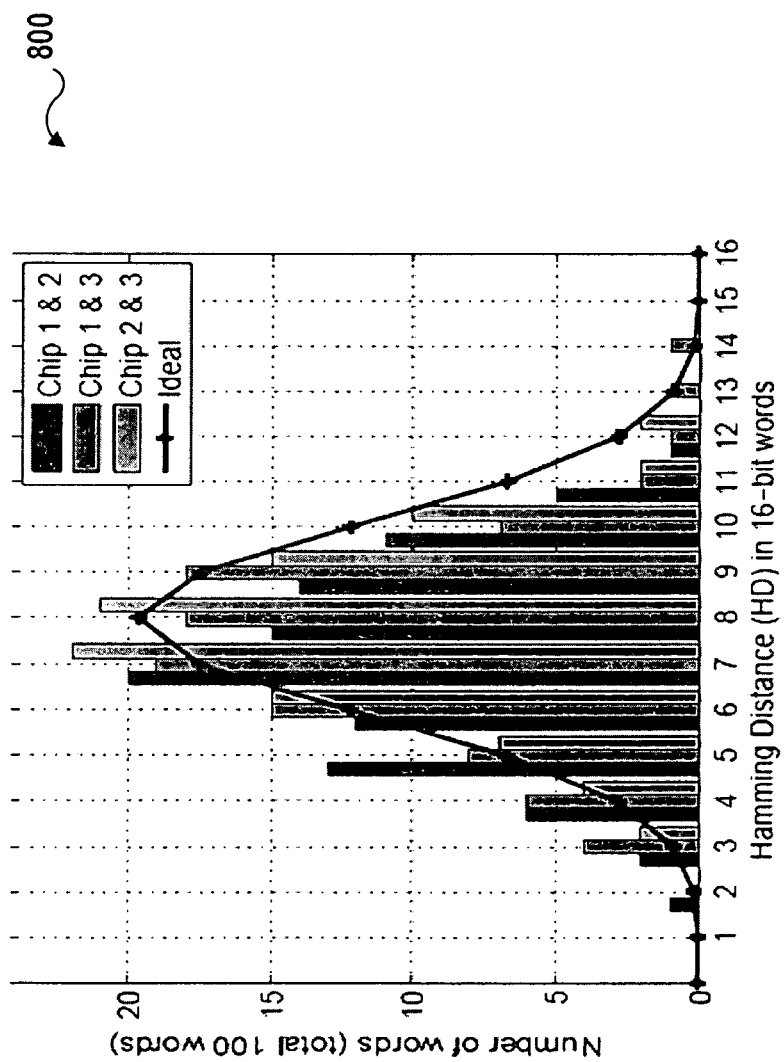
FIG. 8 shows example data in a histogram of Hamming distance (HD) of response words from the HCI-SAs across three chips. Also shown is an example probability mass function of the HD in responses from ideally unique chips.

Uniqueness is a measure of how uncorrelated the response bits are across chips, and ideally the response bits should differ with a probability of 0.5. The Hamming distance of a k-bit response from ideally unique chips should follow a binomial distribution with parameters N=k and p=0.5 and the mean of the HD distribution should be equal to k/2. In an example, 100 16-bit response words (i.e., k=16) are generated from the measured outputs of the 1600 HCI-SAs on three exemplar chips. These words are generated at 27.0 and 1.0V after the HCI-SAs have been stressed for 25 s. FIG. 8 is a histogram 800 shows that the pair-wise HD of response bits from the three chips is close to ideal with means of 7.32, 7.36, and 7.50.

PUF randomness is a measure of the unpredictability of the response bits. In an ideal random response, the % 1's and % 0's in the response should be equal. In a measured response of 1600 HCI-SAs from three exemplar chips, after a 25 s stress, the % 1's are 60.6%, 63.6%, and 61.4% which corresponds to entropy of 0.967, 0.946, and 0.962 respectively.

By using the HCI response reinforcement techniques described herein, a core PUF reliability can be enhanced thus reducing a strength of an error correction codes (ECC) function. As the ECC overheads (e.g., area, power, delay, and complexity) can scale quickly with the ECC strength, an overall PUF efficiency can be boosted by using the disclosed HCI response reinforcement techniques. While these methods can be used in applications requiring high PUF circuit reliability such as key generation, other applications can also benefit from improved PUF circuit reliability and efficiency.

Other examples are within the scope and spirit of the description and claims. Additionally, certain functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

It will thus be seen that the objects set forth above, among those made apparent from the preceding description, are efficiently attained and, because certain changes may be made in carrying out the above method and in the construction(s) set forth without departing from the spirit and scope of the disclosure, it is intended that all matter contained in the above description and shown in the accompanying drawings shall be interpreted as illustrative and not in a limiting sense.

A number of exemplary implementations of the invention have been described. Nevertheless, it will be understood by one of ordinary skill in the art that various modifications may be made without departing from the spirit and scope of the invention.

What is claimed is:

1. A method comprising:
   obtaining a physical unclonable function (PUF) circuit;
   said PUF circuit configured to provide, during a first operational mode, an output signal that is dependent on a first electric characteristic of the PUF circuit;
   causing the PUF circuit to enter a second operational mode by:
      applying a stress signal to the PUF circuit that changes an absolute value of the first electric characteristic, relative to another value of the first electric characteristic during the first operational mode of the PUF circuit; and
      adjusting, based on changing the absolute value of the first electric characteristic, a bias magnitude of the output signal relative to another bias magnitude of the output signal during the first operational mode of the PUF circuit;
   wherein first and second inputs of the PUF circuit are respectively received by at least a first circuit component having the first electric characteristic and a second circuit component having a second, different electric characteristic; and
   receiving the output signal of the PUF circuit, wherein the output signal is based on the first and second electric characteristics.

2. The method of claim 1, wherein, adjusting, based on changing the absolute value of the first electric characteristic, the bias magnitude of the output signal comprises changing the bias magnitude of the output signal relative to a previous bias magnitude of the output signal before the application of the stress signal.

3. The method of claim 1, wherein, applying the stress signal to the PUF circuit that changes an absolute value of the first electric characteristic comprises applying the stress signal to the PUF circuit to increase the absolute value of the first electric characteristic.

4. The method of claim 1, wherein adjusting, based on changing the absolute value of the first electric characteristic, the bias magnitude of the output signal comprises:
   increasing a probability of the PUF circuit for resolving to a certain output value during a plurality of times the PUF circuit is operated in the first operational mode, relative to another probability of the PUF circuit resolving to the certain output value independent of the adjusting.

5. The method of claim 1, wherein causing the PUF circuit to enter the second operational mode comprises stressing the PUF circuit by a response reinforcement process to increase the value of the first electric characteristic, relative to the other value of the first electric characteristic during the first operational mode of the PUF circuit, wherein the response reinforcement process is based on a circuit aging phenomena.

6. The method of claim 1, wherein causing the PUF circuit to enter the second operational mode comprises:
   stressing the PUF circuit by a response reinforcement process to increase the value of the first electric characteristic, relative to the other value of the first electric characteristic during the first operational mode of the PUF circuit, wherein the response reinforcement process is selected one or more of a) hot carrier injection, b) negative-bias temperature instability, c) positive-bias temperature instability, and d) electromigration.

7. The method of claim 1, further comprising:
   restoring the PUF circuit to the first operational mode, following a certain duration of the stress signal; and
   exiting the second operational mode.

8. The method of claim 1, wherein the PUF circuit comprises a delay based PUF circuit.

9. The method of claim 1, wherein the PUF circuit comprises a bistable based PUF circuit.

10. The method of claim 1, wherein obtaining the PUF circuit comprises:
    obtaining a substrate that comprises the PUF circuit;
    wherein the output signal is further dependent on one or more physical characteristics of the substrate.

11. The method of claim 1, further comprising:
    causing each of the first and second inputs of the PUF circuit to be set to a predetermined voltage level.

12. The method of claim 1, wherein the first and second circuit components comprise first and second transistor devices, respectively, and the first and second electric characteristics comprise first and second threshold voltages, respectively, for the corresponding first and second transistor devices.

13. The method of claim 1, wherein the output signal is based on a difference between a first and a second delay value for the corresponding first and second circuit components.

14. The method of claim 12, wherein the output signal is based on a difference in magnitudes between the first and second threshold voltages.

15. The method of claim 1, further comprising:
during the second operational mode:
applying the stress signal as a first stress signal to a first one of the first and second transistor devices; and
applying a second, different stress signal to a second, different one of the first and second transistor devices.

16. The method of claim 1, further comprising:
during the first operational mode, storing first and second transistor device output values that are based on the bias magnitude of the output signal;
based on the first and second transistor device output values, determining which of the first and second transistors devices is to be stressed;
during the second operational mode, selecting one of the first and second transistor devices to be stressed, based on the stored first and second transistor device output values; and
applying the stress signal to the selected one of the first and second transistor devices.

17. The method of claim 1, wherein the stress signal comprises a stress voltage signal with a stress magnitude that is greater than a voltage magnitude of an operating voltage used during the first operational mode of the PUF circuit.

18. The method of claim 17, wherein the stress magnitude is at least 1.25 times the voltage magnitude of the operating voltage used during the first operational mode of the PUF circuit.

19. The method of claim 1, wherein the stress signal comprises a stress circuit signal with a magnitude that is greater than a current magnitude of a current flowing during the first operational mode of the PUF circuit.

20. The method of claim 1, further comprising:
selecting at least one of a magnitude and a duration of the stress signal, with selecting based on a magnitude of a stress signal value and a duration of the stress signal value for causing at least a plurality of carriers in a first transistor device of the PUF circuit to be injected into a gate oxide of the first transistor device.

21. The method of claim 1, wherein applying the stress signal to the PUF circuit comprises:
causing a stress current with a stress current magnitude that is greater than an operating current magnitude of an operating current that is flowing during the first operational mode;
wherein a flow of the stress current during the second operational mode is in a same direction as a flow of the operating current during the first operational mode.

22. The method of claim 1, wherein adjusting, based on changing the absolute value of the first electric characteristic, the bias magnitude of the output signal comprises:
increasing a probability of the PUF circuit for resolving to a certain output value over a plurality of operating conditions, relative to another probability of the PUF circuit resolving to the certain output value independent of the adjusting.

23. The method of claim 1, wherein applying the predetermined stress signal to the PUF circuit comprises:
causing a stress current with a current magnitude that is greater than an operating current magnitude of an operating current that is flowing during the first operational mode;
wherein a flow of the stress current during the second operational mode is in an opposite direction as a flow of the operating current during the first operational mode.

24. The method of claim 1, further comprising re-adjusting the bias magnitude of the output signal relative to a previous value of the bias magnitude of the output signal by changing the absolute value of the first electric characteristic, relative to a previous value of the first electric characteristic during the first operational mode.

25. The method of claim 24, further comprising performing the re-adjusting a plurality of times over a life span of the PUF circuit.

26. The method of claim 1, wherein the first input comprises a same input as the second input.

27. The method of claim 1, wherein the first input differs from the second input.

28. The method of claim 1, wherein the first and second inputs of the PUF circuit being respectively received by at least the first circuit component having the first electric characteristic and the second circuit component having a second, different electric characteristic comprises:
receiving the first input of the PUF circuit by the first circuit component;
generating, by the first circuit component and based on receiving the first input, the second input for the second circuit component; and
receiving the second input by the second circuit component.

29. A physical unclonable function (PUF) circuit comprising:
first and second transistor devices, wherein a first gate terminal of the first transistor device and a second gate terminal of the second transistor device comprises a first and a second input terminal, respectively, of the PUF circuit;
a cross-coupling circuit, wherein the cross-coupling circuit comprises third, fourth, fifth, and sixth transistor devices, wherein gate terminals of the third and fourth transistor devices are connected in a first common gate terminal and gates terminals of the fifth and sixth transistor devices are respectively connected in a second common gate terminal;
a sense enable terminal connected to a seventh transistor device, the seventh transistor device connected to the first and second transistor devices;
a first output terminal connected to the first common gate terminal;
a second output terminal connected to the second common gate terminal; and
a response reinforcement circuit comprising:
a thick gate oxide device connected to the first and second transistor devices; and
first and second latch circuits, wherein the first latch circuit comprises at least an eighth transistor device connected to the first output terminal and a first buffer device connected to the first input terminal, and wherein the second latch circuit comprises at least a ninth transistor device connected to the second output terminal and a second buffer device connected to the second input terminal; and
a stress mode enable terminal connected to each of the thick gate oxide device, the eighth transistor device, and the ninth transistor device.

30. A secure device comprising:
a physical unclonable function (PUF) circuit for authenticating an identity of the secure device, wherein the PUF circuit is configured to provide, during a first operational mode, an output signal that is dependent on a first electric characteristic of the PUF circuit; and a response reinforcement circuit, wherein the response reinforcement circuit is configured to cause the PUF circuit to enter a second operational mode by:

applying a stress signal to the PUF circuit that changes a value of the first electric characteristic relative to another value of the first electric characteristic during the first operational mode; and adjusting, based on changing the absolute value of the first electric characteristic, a bias magnitude of the output signal relative to another bias magnitude of the output signal during the first operational mode, wherein a first circuit component having the first electric characteristic is configured to receive a first input;

wherein a second circuit component having a second, different electric characteristic is configured to receive a second input; and wherein the output signal that the PUF circuit is configured to provide is based on the first and second electric characteristics.

31. The secure device of claim 30, wherein the response reinforcement circuit is configured to cause the PUF circuit to enter the second operational mode based on a hot carrier injection to change the value of the electric characteristic, relative to the other value of the electric characteristic during the first operational mode.

* * * * *